No. 871,149. PATENTED NOV. 19, 1907.
J. E. SMITH.
AXLE FOR PIT CARS.
APPLICATION FILED MAY 17, 1907.
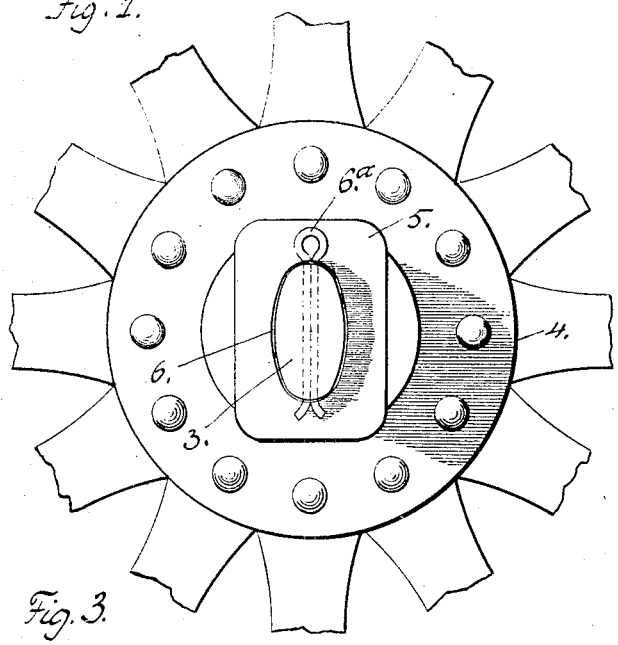
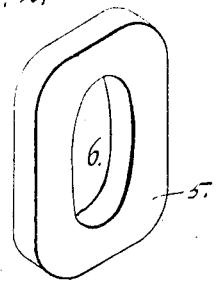
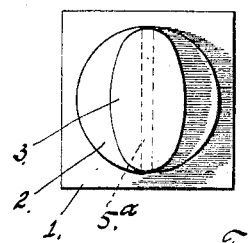
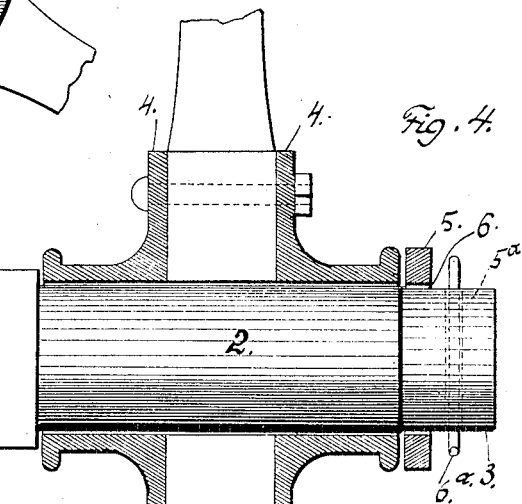
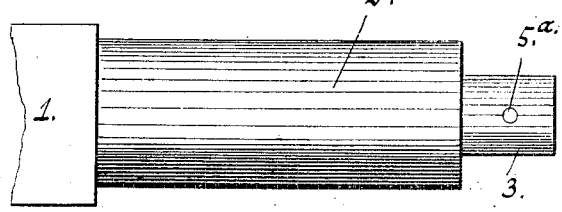
WITNESSES:
A. H. Rabsaig
K. H. Butler
INVENTOR
John Elsworth Smith
By H. C. Evert & Co.
Attorneys

UNITED STATES PATENT OFFICE.

JOHN ELSWORTH SMITH, OF ELIZABETH, PENNSYLVANIA.

AXLE FOR PIT-CARS.

No. 871,149.

Specification of Letters Patent.

Patented Nov. 19, 1907.

Application filed May 17, 1907. Serial No. 374,205.

*To all whom it may concern:*

Be it known that I, JOHN ELSWORTH SMITH, a citizen of the United States of America, residing at Elizabeth, in the county of Allegheny and State of Pennsylvania, have invented certain new and useful Improvements in Axles for Pit-Cars, of which the following is a specification, reference being had therein to the accompanying drawing.

This invention relates to improvements in axles for pit cars, and the invention has for its object the provision of positive and reliable means for preventing a washer upon the axle from rotating by frictional engagement with the hub of a wheel journaled upon said axle.

Briefly described, my invention consists in providing an axle with oval ends, and in providing a washer with oval openings whereby said washers can be fitted upon the ends of the axle. Keys are then employed for retaining the washers upon the oval ends of the axle, whereby said washers cannot be rotated or become disengaged from the axle.

The detail construction entering into my invention will be hereinafter more fully described, and then specifically pointed out in the appended claims.

Reference will now be had to the drawing forming a part of this specification, wherein like numerals of reference designate corresponding parts throughout the several views, in which:

Figure 1 is an end view of an axle, constructed in accordance with my invention, illustrating a wheel journaled upon the ends of the axle, Fig. 2 is a perspective view of a washer used in connection with the axle, Fig. 3 is an end view of the axle proper, Fig. 4 is an elevation of an axle constructed in accordance with my invention, illustrating a wheel journaled thereon, Fig. 5 is an elevation of one end of the axle.

In the accompanying drawings, 1 indicates an axle provided with a cylindrical spindle 2, terminating in an oval end 3. Upon the cylindrical spindle 2 of the axle is mounted a conventional form of wheel 4, said wheel being held thereon by a washer 5, having an oval opening 6, whereby said washer can be fitted upon the oval end 3 of said axle. The oval end 3 of the axle is provided with an opening $5^a$ to receive a split key $6^a$ employed for retaining the washer upon the end of the axle.

Since the axle of a pit car is stationary, and the ends of the same are oval, it will be impossible for the washers 5 mounted upon the ends of the axle to rotate, and it will be equally impossible for such washers to become detached from the axle, owing to the fact that the keys 6 are employed for retaining the same thereon.

In retaining the washers stationary, I prevent such washers from rotating and becoming worn, and rendered useless for the purpose for which they are employed.

I do not care to confine myself particularly to pit cars, as the axles of numerous vehicles can be constructed in accordance with my invention to increase the longevity of washers employed for retaining wheels upon axles.

Having fully described my invention, what I claim and desire to secure by Letters Patent, is:—

1. In combination, an axle having a pair of cylindrical spindles each of which terminates in a reduced oval shaped end, each of said oval shaped ends having an uninterrupted periphery, and rectangular washers having oval shaped openings, said washers fitted upon the reduced ends of the spindles and adapted to engage the hubs of the wheels when mounted upon the spindles.

2. In combination, an axle having cylindrical spindles each of which terminates in a reduced oval-shaped end, each of said ends having a vertically-extending opening, the periphery of each of said ends being smooth and uninterrupted throughout, rectangular washers having oval shaped openings, said washers fitted upon the oval-shaped ends of said spindles and adapted to engage the hubs of the wheels when mounted upon the spindles, and cotter pins extending through the openings in the oval-shaped ends for maintaining the washers upon said ends.

In testimony whereof I affix my signature in the presence of two witnesses.

JOHN ELSWORTH SMITH.

Witnesses:
ROBERT MCCLURE,
JAMES M. NEVIN.